United States Patent

Luethi, et al.

[15] 3,639,249
[45] Feb. 1, 1972

BIS-OXALIC ACID ESTER AMIDES FOR USE AS ULTRAVIOLET STABILIZERS

[72] Inventors: Christian Luethi, Muenchenstein; Hans Rudolf Biland, Gelterkinden; Max Duennenberger, Frenkendorf, all of Switzerland

[73] Assignee: Ciba Limited, Basel, Switzerland

[22] Filed: May 13, 1968

[21] Appl. No.: 728,836

[30] Foreign Application Priority Data

May 16, 1967 Switzerland ..........................6902/67

[52] U.S. Cl. ..........................252/300, 260/45.9, 260/397.6
[51] Int. Cl. ..........................F21v 9/06
[58] Field of Search ..........................252/300; 260/397.6, 45.9

[56] References Cited

UNITED STATES PATENTS

| | | | |
|---|---|---|---|
| 3,138,572 | 6/1961 | Feondri et al. | 260/397.6 |
| 2,956,896 | 10/1960 | Kibler et al. | 252/300 |
| 2,268,754 | 1/1942 | Kharasch et al. | 260/397.6 |

FOREIGN PATENTS OR APPLICATIONS

| | | | |
|---|---|---|---|
| 517,421 | 1/1940 | Great Britain | 260/397.6 |

Primary Examiner—Charles E. Van Horn
Assistant Examiner—J. P. Brammer
Attorney—Harry Goldsmith, Joseph G. Kolodny, Bryant W. Brennan and Edward J. Sites

[57] ABSTRACT

The present invention provides a process for protecting organic materials that can be damaged by ultraviolet light from the effects of ultraviolet rays, characterized in that a bis-oxalic acid amide ester is incorporated with, or applied to the surface of the materials to be protected, or a filter layer containing the bis-oxalic acid amide esters is placed in front of said materials, the said bis-oxalic acid amide ester corresponding to the formula:

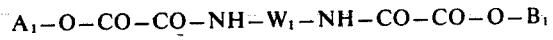

$$A_1-O-CO-CO-NH-W_1-NH-CO-CO-O-B_1$$

in which $A_1$ and $B_1$ are identical or different and each represents an organic residue and should not displace the absorption maximum of these compounds to values above 370 m$\mu$; $W_1$ represents an organic residue and $X_1$ represents an alkylene group containing 1 to 4 carbon atoms or a bridge member $-O-$, $-S-$, $-N-$ or $-SO_2-$.

Furthermore the invention discloses a certain class of novel symmetric bis-oxalic acid amide esters as defined by formula (6) of the specification and a process for the manufacture of the symmetric bis-oxalic acid amide esters defined above.

6 Claims, No Drawings

BIS-OXALIC ACID ESTER AMIDES FOR USE AS ULTRAVIOLET STABILIZERS

The present invention is concerned with the stabilization of organic materials, especially towards the effects of ultraviolet rays, by means of bis-oxalic acid ester amides, and provides processes for their manufacture as well as an important group of new bis-oxalic acid ester amides that are valuable to the purpose mentioned.

Accordingly, the invention provides a process for protecting organic materials that may be damaged or destroyed by ultraviolet rays from the influence of ultraviolet rays, by incorporating with the material to be protected bis-oxalic acid ester amides of the following definition, or by applying them to the surface of said materials or by placing in front of the material to be protected a filter layer containing such bis-oxalic acid ester amides. The bis-oxalic acid ester amides to be used for such protection correspond in their most general form to the formula (1) $A_1$—O—CO—CO—NH—$W_1$—NH—CO—CO—O—$B_1$ in which $A_1$ and $B_1$ are identical or different and each represents an alkyl, alkenyl, cycloalkyl, aralkyl or aryl group; these groups may contain further substituents and should not displace the absorption maximum of the said compounds to values above 370 m$\mu$; $W_1$ represents a phenylene, diphenylene, naphthylene residue or a residue of the formula (1a) 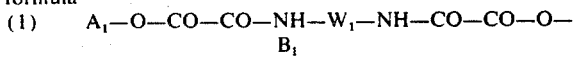

and the phenylene groups of these residues may contain one or two substituents $Z_1,Z_1$ being an alkyl or alkoxy group containing one to four carbon atoms, a halogen atom or an $SO_3H$ group; $m$=0, 1 or 2, and $X_1$ represents an alkylene group containing one to four carbon atoms or a bridge member —O—, —S—, —N— or —SO$_2$—.
          $|$ As further substituents of the residue $A_1$ and $B_1$ (or of the residues A defined below) there may be used within the definition of the above formula especially alkyl groups, halogen atoms, alkoxy, alkoxyalkoxy, cyano or tertiary amino groups.

When $X_1$ in the above formula represents a nitrogen bridge member —N—, it should be borne in mind that the free valency of this bridge member is saturated in most cases by a hydrogen atom or an alkyl group containing one to four carbon atoms.

Of paramount importance because of the greater ease with which they can be prepared are symmetric bis-oxalic acid amide esters of the formula (2) $A_2$—O—CO—CO—NH—$W_1$—NH—CO—CO—O—$A_2$ in which $A_2$ represents an alkyl, alkenyl, cycloalkyl or aralkyl radical containing up to 20 carbon atoms, which does not displace the absorption maximum of these compounds to a value above 370 m$\mu$, and which may, if desired, contain further substituents, and $W_1$ represents a phenylene, diphenylene, naphthylene residue or a residue (1a) 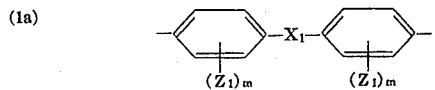

and the phenylene groups of these residues may contain one or two substituents $Z_1,Z_1$ being an alkyl or alkoxy group containing one to four carbon atoms, a halogen atom or an $SO_3H$ group; $m$=0, 1 or 2, and $X_1$ represents an alkylene group containing one to four carbon atoms or a bridge member —O—, —S—, —NH— or —SO$_2$—. The identical substituents as shown for formula (1) may be contained also in the above-mentioned residue $A_2$.

According to the preferred variant of the process of this invention symmetric bis-oxalic acid amide esters are used that correspond to the formula (3) $A_3$—O—CO—CO—NH—$W_2$—NH—CO—CO—O—$A_3$ in which $A_3$ represents an alkyl group containing one to 18 carbon atoms, a phenylalkyl group whose alkyl residue contains one to four carbon atoms, an alkoxyalkyl group containing one to 12 carbon atoms and preferably one to three —O— bridges, an alkenyl group containing one to four carbon atoms or a cyclohexyl group, and $W_2$ represents a 1,3- or 1,4-phenylene group, a 4,4'-diphenylene group, a 1,4- or 1,5-naphthylene group or a group (3a) 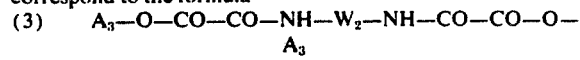

in which $X_2$ is a bridge member —SO$_2$— or a linear or branched alkylene group containing one to four carbon atoms, and phenylene nuclei of the said groupings may contain one or two substituents $Z_2$ (= alkyl or alkoxy group with one to four carbon atoms or halogen) and $m$=0, 1 or 2.

In a technically especially progressive variant symmetric bis-oxalic acid amide esters are used that correspond to the formula (4) $A_3$—O—CO—CO—NH—$W_3$—NH—CO—CO—O—$A_3$ in which $A_3$ represents an alkyl group containing one to 18 carbon atoms, a phenylalkyl group whose alkyl residue contains one to four carbon atoms, an alkoxyalkyl group containing one to 12 carbon atoms and preferably one to three —O— bridges, an alkenyl group containing one to four carbon atoms or a cyclohexyl group; $W_3$ represents a 1,3- or 1,4-phenylene group, a 4,4'-diphenylene group, a 1,4- or 1,5-naphthylene group, and phenylene nuclei of the said groupings may contain one or two substituents $Z_2$, $Z_2$ being an alkyl or alkoxy group containing one to four carbon atoms or a halogen atom.

A subgroup of the compounds to be used according to this invention comprises symmetric bis-oxalic acid amide esters of the formula (5) $A_4$—O—CO—CO—NH—$W_2$—NH—CO—CO—O—$A_4$ in which $A_4$ represents an alkyl group containing one to six carbon atoms and $W_2$ a 1,3- or 1,4-phenylene group, a 4,4'-diphenylene group, a 1,4- or 1,5-naphthylene group of a group (3a) 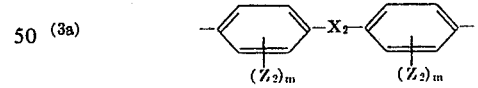

in which $X_2$ represents a bridge member —SO$_2$— or a linear or branched alkylene group containing one to four carbon atoms, and phenylene nuclei of the said groupings may contain one or two substituents $Z_2,Z_2$ being an alkyl or alkoxy group containing one to four carbon atoms or a halogen atom, and $m$=0, 1 or 2.

It is also possible to use with advantage the new bis-oxalic acid amide esters of the formula (6) $A_5$—O—CO—CO—NH—$W_2$—NH—CO—CO—O—$A_5$ in which $A_5$ represents an alkyl group containing seven to 18 carbon atoms, a phenylalkyl group whose alkyl residue contains one to four carbon atoms, an alkoxyalkyl group containing one to eight carbon atoms and one to three oxygen bridges, an allyl group or a cyclohexyl group, and $W_2$ represents a 1,3- or 1,4-phenylene group, a 4,4'-diphenylene group, a 1,4- or 1,5-naphthylene group or a group (3a) 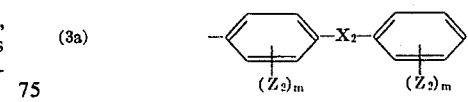

in which $X_2$ is a bridge member —$SO_2$— or a linear or branched alkylene group containing one to four carbon atoms, and phenylene nuclei of the said groupings may contain one or two substituents $Z_2,Z_2$ being an alkyl or alkoxy group containing one to four carbon atoms or a halogen atom, and $m=0, 1$ or 2. In connection with these and the preceding formulas it should also be said that the alkyl groups mentioned may be branched so that compounds thus constituted may be particularly valuable in certain cases.

As examples of important types of compounds to be used in this invention the following bis-oxalic acid amide esters may be mentioned:

m-phenylene-bis-(oxalamido-γ-chloropropyl ester),
m-phenylene-bis-(oxalamido-methyl ester),
p-phenylene-bis-(oxalamido-isoamyl ester),
p-phenylene-bis-(γ-cyanopropyl ester),
p-phenylene-bis-(oxalamido-dodecyl ester),
(6-methyl-1,3-phenylene)-bis-(oxalamido-crotyl ester),
(2,5-dichloro-1,4-phenylene)-bis-(oxalamido-butyl ester),
(2,5-dimethoxy-1,4-phenylene)-bis-(oxalamido-methyl ester),
(2,5-dimethyl-1,4-phenylene)-bis-(oxalamido-ethoxyethyl ester),
4,4'-diphenylene-bis-(oxalamido-butyl ester),
4,4'-diphenylene-bis-(oxalamido-γ-phenylpropyl ester),
4,4'-diphenylene-bis-(oxalamido-p-chlorobenzyl ester),
(3,3'-dimethyl-4,4'-diphenylene)-bis-(oxalamido-isobutyl ester),
(3,3'-dimethoxy-4,4'-diphenylene)-bis-(oxalamido-methyl ester),
(3,3'-dimethoxy-4,4'-diphenylene)-bis-(oxalamido-p-methylbenzyl ester),
4,4'-bis-(oxalamido-undecyl ester)-diphenylsulphide,
4,4'-bis-(oxalamido-cyclohexyl ester)-diphenylether,
4,4'-bis-(oxalamido-n-octadecyl ester)-diphenylsulphone,
4,4'-bis-(oxalamido-ethoxyethyl ester)-diphenylmethane.

The compounds described above are accessible by known processes. The most important method of manufacturing the compounds of the formula (2) which are of importance to industry and have symmetric constitution with respect to the residues $A_2$ consists in reacting 1 mol of a diamine of the formula (7)    $NH_2$—$W_1$—$NH_2$ with 2 mols of an oxalic ester of the formula (8)    $A_2$—O—CO—CO—$Y_1$ in which $W_1$ and $A_2$ have the above meanings and $Y_1$ represents an alkoxy group which preferably contains one to six carbon atoms, or is a halogen atom, by allowing them to react at a temperature within the range from 0° to 200° C.; the esterification is preferably conducted in presence of excess oxalic ester, whereby the residue $A_2$ can be exchanged for another residue $A_2$ by trans-esterification, and, if desired, in a solvent that is chemically inert towards the reactants. If this reaction is accompanied by elimination of an alcohol, it is advantageously removed from the reaction mixture by distillation, provided its boiling point allows this.

The reaction, which is preferably performed in presence of an excess of oxalic ester, is carried out with special advantage with an up to 2-fold molecular excess.

The procedure described above is especially applicable to the manufacture of compounds of the formula (5), reacting 1 mol of a diamine of the formula (7a)    $NH_2$—$W_2$—$NH_2$ with 2 mols of an oxalic ester of the formula (9)    $A_4$—O—CO—CO—$Y_2$ in which $W_2$ and $A_4$ have the above meanings and $Y_2$ represents an alkoxy group containing one to six carbon atoms.

According to a preferred variant the condensation of the diamine of the formula (7a) with an oxalic acid diester of the formula (9) or (8) is carried out in presence of anhydrous boric acid (preferably 0.02 to 0.1 mol for every mol of diamine) at a temperature from 80° to 130° C. Suitable solvents that are inert towards the reactants should as far as possible be solvents for both reactants and have a boiling point of at least 100° C. Such solvents are, for example, chlorobenzenes, tetrachloroethane, xylenes, ethylamyl ketone, diethyleneglycol diethyl ether or isophorone.

According to another process for the manufacture of the compounds to be used in this invention, for example those of the formula (2), a diamine of the formula (7) is reacted with an oxalic ester halide of the formula

(10)    $A_2$—O—CO—CO—Hal where $A_2$ has the above meaning and Hal is a halogen atom, especially a chlorine atom. In these cases it is advantageous to use a solvent that boils between 30° and 120° C., is inert towards the reactants and is specially capable of dissolving the diamine of the formula (7), such as benzene, toluene, acetone, ethyl acetate or dioxan. This reaction may be performed without a condensing catalyst; the temperature to be maintained ranges from 0° to 130° C., preferably from 20° to 80° C. As a rule, an equivalent quantity of the reactant of the formula (10) suffices, that is to say 2 mols thereof for every mol of diamine.

According to a variant which is specially valuable to the manufacture of compounds of the above formulas the bis-oxalic acid amide esters are trans-esterified on the ester bond, that is to say a residue $A_2$, $A_3$, $A_4$ or $A_5$ is exchanged for a differently constituted residue covered by the same definition, advantageously in presence of a known trans-esterifying catalyst.

This trans-esterification process is specially valuable to the manufacture of compounds of the formula (6): A compound of the formula (5)    $A_4$—O—CO—CO—NH—$W_2$—NH—CO—CO—O—$A_4$ — in which $A_4$ represents an alkyl group containing one to six carbon atoms and $W_2$ a 1,3- or 1,4- phenylene group, a 4,4'-diphenylene group, a 1,4- or 1,5naphthylene group or a group

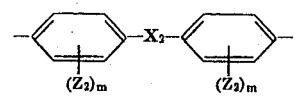

— where $X_2$ is a bridge member —$SO_2$— or a linear or branched alkylene group containing one to four carbon atoms, and phenylene nuclei of the said groupings may contain one or two substituents $Z_2,Z_2$ being a halogen atom or an alkyl or alkoxy group containing one to four carbon atoms, and $m=0, 1$ or 2 — is reacted with an alcohol of the formula

(11)    $A_5$—OH in presence of a trans-esterifying catalyst in a solvent, at a temperature ranging from 80° to 200° C.

Suitable trans-esterifying catalysts are, for example, strong alkalies such as alkali metal alcoholates and alkali metals or acid catalysts such as hydrochloric acid, concentrated sulphuric acid, p-toluenesulphonic acid and the like, which are used in catalytic amounts, that is to say in an amount of about 0.01 mol or 0.2 mol calculated from the grouping to be trans-esterified.

Solvents suitable for the trans-esterification are quite generally all those mentioned above, except that their boiling point should be from 80° to 200° C. It is of course also possible to use as solvent the alcohol of the formula (11). Further suitable are ketones and halobenzenes.

Starting materials suitable for trans-esterification reactions are more especially compounds of the formula (2) in which $A_2$ is an alkyl radical containing up to six carbon atoms, preferably methyl or ethyl.

By using the corresponding alcohols it is possible to introduce by the trans-esterification more especially the residues of alcohols such as butanol, 2-ethylhexyl, dodecyl, octadecyl, isoamyl, benzyl, allyl, cyclohexyl or γ-chloropropyl alcohol.

In view of the fact that the trans-esterification is an equilibrium reaction it is advantageous to use an excess of the alcohol whose residue is to be introduced. In general, a 0.05 to 0.3 molar excess will suffice.

Depending on the reactivity of the alcohol concerned the trans-esterifying temperature ranges from about 50° to 180° C.; to prevent any undesired side-reactions the temperature should if possible be kept below 130° C., preferably between 100° and 130° C. To promote the progress of the reaction the alcohol liberated from the starting material should be more volatile than the alcohol to be introduced and it should advantageously be continuously removed from the system, for example by blowing it out with an inert gas, such as a current of nitrogen.

With the aid of the compounds of the above formula (1) and of the following formulas it is possible principally to stabilize and protect all those organic materials which are in any form damaged or destroyed by the action of ultraviolet rays. Such damages caused by the identical agency, namely ultraviolet irradiation, may have widely differing results, for example changes in color, changes in the mechanical properties (brittleness, fissuring, tear strength, flexural strength, abrasive strength, elasticity, ageing), triggering off of undesired chemical reactions (decomposition of sensitive chemical substances, for instance of medicaments, photochemically induced rearrangements, oxidation or the like, for example of oils containing unsaturated fatty acids), causing of burns and irritations (for example on human skin), and the like. The oxalic acid derivatives defined above are preferably used to protect polycondensates and polyadducts from the effects of ultraviolet rays. In addition, a rather large number of the compounds defined above have in addition to the ultraviolet stabilizing activity also a stabilizing effect against the action of oxygen and heat and they also possess antistatic properties.

The organic materials to be protected may be in a wide variety of processing stages and physical states, their common characterizing features being their sensitivity towards ultraviolet rays.

As substances of low or high molecular weight that can be protected or stabilized by the present process there may be mentioned, for example, without intending any limitation thereto: Organic natural substances such as are used for pharmaceutical purposes (medicaments), ultraviolet-sensitive dyestuffs, compounds which as victuals or in victuals are decomposed by the action of light (unsaturated fatty acids in oils) and the like.

As examples of organic substances of high molecular weight the following may be mentioned:

(I) Synthetic organic materials of high molecular weight, such as
a. Polymers based on organic compounds containing at least one polymerizable carbon-to-carbon double bond, that is to say their homo- or copolymers and their aftertreated products, for example cross-linking, grafting or degradation products; polymer dilutions; products obtained by modifying reactive groupings in the polymer molecule, such for example as polymers based on α,β-unsaturated carboxylic acids (e.g., acrylates, acrylamides, acrylonitrile), of olefin hydrocarbons e.g., α-olefins, ethylene, propylene or dienes, i.e., also rubbers and rubberlike polymers (also so-called ABS polymers); polymers based on vinyl and vinylidene compounds (e.g., styrene, vinyl esters, vinylchloride, vinyl alcohol), of halogenated hydrocarbons, of unsaturated aldehydes and ketones, allyl compounds and the like;
b. other polymers as obtained e.g., by ring opening, e.g., polyamides of the polycaprolactam type; furthermore formaldehyde polymers, or polymers accessible by polyaddition as well as polycondensation, such as polyethers, polythioethers, polyacetals, thioplasts.
c. Polycondensates or precondensates based on bifunctional or polyfunctional compounds containing condensible groups, their homo- and cocondensates and aftertreated products, for example: Polyesters [saturated (e.g., polyethylene terephthalate) or unsaturated (e.g., maleic acid-dialcohol polycondensates and their cross-linked products with copolymerizable vinyl monomers), linear or branched (also those based on higher hydric alcohols, e.g., alkyd resins)], polyamides (e.g., hexamethylenediamine adipate), maleinate resins, melamine resins, phenol resins (e.g., novolaks), aniline resins, furan resins, carbamide resins and their precondensates and analogously constituted products; polycarbonates, silicone resins and others.
d. Polyadducts such as polyurethanes (cross-linked or not), epoxy resins.

II. Semisynthetic organic materials such, for example, as cellulose esters or mixed esters (acetate, propionate), nitrocellulose, cellulose ethers, regenerated cellulose (viscose rayon, cuprammonium cellulose) or their aftertreated products or casein synthetics.

III. Natural organic materials of animal or vegetable origin, e.g., based on cellulose or proteins such as wool, cotton, silk, bast, jute, hemp, furs and hairs, leathers, wood pulp in fine distribution, natural resins (such as colophony, especially lacquer resins, gelatin, glues; also rubber, gutta percha, balata and their aftertreated and modified products, degradation products, products accessible by modification or reactive groups.

The organic materials concerned, especially plastics of the type of vinylchloride polymers, saturated and unsaturated polyesters, celluloses and polyamides, may be at a wide variety of processing stages (raw materials, semifinished or finished products) and physical states. They may in the form of a wide variety of shaped articles, that is to say e.g., predominantly three-dimensional objects such as sections, containers or various workpieces, chips or granulates or foamed articles; predominantly two-dimensional structures such as films, foils, lacquers, impregnations or coatings or predominantly unidimensional products such as filaments, fibers, flocks, bristles or wires. The said materials may also be in unshaped states in a wide variety of homogeneous or inhomogeneous forms of distribution and physical states, being, for example, powders, solutions, normal or reversed emulsions (creams), dispersions, latices, sols, gels, putties, waxes, adhesives or grouting compositions.

Fibrous materials may be in a wide variety of predominantly nontextile processing forms, being for instance threads, yarns, fiber fleeces, felts, paddings, flocculated structures, or textile fabrics or textile composites, knitwear, paper, cardboards or the like.

The new stabilizers may be used, for example, as follows:
a. In cosmetic preparations such as perfumes, dyed or undyed soaps and bath salts, skin and face creams, powders, repellants and especially sunburn oils and creams;
b. in admixture with dyestuffs or pigments or as additives to dyebaths, printing, discharge or reserve pastes; also for aftertreating dyeings, prints or discharge prints;
c. in admixture with so-called carriers, antioxidants, other light filters, heat stabilizers or chemical bleaches;
d. in admixture with cross-linking agents, dressings agents such as starches or synthetic dressing agents;
e. in combination with detergents; the detergent and the stabilizer may, if desired, be added separately to the washing liquor;
f. in gelatin layers for photographic purposes;
g. in combination with polymeric vehicles (polymers, polycondensates or polyadducts) in which the stabilizer, if desired side by side with other substances, is incorporated in dissolved or dispersed form, e.g., in coating, impregnating or binding agents (solutions, dispersions, emulsions) for textiles, fleeces, paper, leather;
h. as additives to a wide variety of industrial products to reduce their ageing tendency, for example as additives to glues, adhesives, paints or the like.

When the protecting agents of this invention are to be used for treating organic textile materials of natural or synthetic origin, e.g., textile fabrics, they may be applied to the substrate to be protected at any desired phase of the final processing, such as during a dressing, anticrease finishing, dyeing or other finishing operation by fixing methods similar to dyeing processes.

The new stabilizers to be used according to this invention are preferably added to or incorporated with the materials before or during the shaping of the latter. Thus, for example, in the manufacture of films, foils, tapes or shaped structures they may be added to the moulding or injection mounting composition or dissolved, dispersed or in any other suitable manner finely distributed in the spinning composition before it is spun. The protective agents may also be added to the starting substances, reaction mixtures or intermediate products used for the manufacture of fully synthetic or semisynthetic organic materials, hence also before or during the chemical reaction, for example in the course of a polycondensation (hence also to precondensates), a polymerization (hence also to prepolymers) or a polyaddition.

An important sphere of application of the stabilizers of this invention is their incorporation with a protective layer used to protect a material placed behind it. This can be achieved by applying the ultraviolet absorber to the surface layer (of a film, a fiber or multidimensional structure), for example similar to a dyeing process, or the active substance may be incorporated with a polymer (polycondensate or polyadduct) film by a known surface treating method with polymeric substances, or the active substance may be dissolved in a suitable solvent and allowed to diffuse or swell into the surface layer. According to another important variant the ultraviolet absorber is incorporated with a self-supporting, substantially two-dimensional support, e.g., a foil or the wall of a vessel, in order to ward off ultraviolet rays from the substance placed behind the support (examples: shopwindows, films, transparent wrappers, bottles).

From the foregoing it is obvious that not only the substrate or support incorporating the ultraviolet absorber is protected but also other accompanying ingredients of the substrate, for example dyestuffs, antioxidants, disinfectants antistatics and other dressings, plasticizers and fillers.

Depending on the type of substance to be protected or stabilized, on its sensitivity or on the form in which the protection or stabilization is achieved the requisite quantity of stabilizer may vary within wide limits, for example from about 0.01 to 10 percent by weight, referred to the weight of substrate to be protected. For most practical purposes a proportion of about 0.05 to 2 percent will suffice.

Accordingly, the process for protecting organic materials from the effects of ultraviolet irradiation and heat as described above consists in homogeneously distributing the compounds defined above in the organic material to be protected, or in applying them to the surface of the material or in covering the material with a filter layer that contains the compounds defined above.

This is most advantageously done by homogeneously distributing the compounds described in substance or as a solution or dispersion in the organic material to be protected in an amount of 0.01 to 10 percent, preferably 0.05 to 2.0 percent, by weight, referred to the weight of the material to be protected before the latter is given its final shape.

When the substances of this invention are to be applied superficially to the substrate to be protected, for instance to a fibrous material (fabric), this is advantageously done by immersing the substrate to be protected in a liquor that contains the ultraviolet absorber in dissolved or dispersed form. Solvents suitable for this purpose are, for example, methanol, ethanol, acetone, ethyl acetate, methylethyl ketone, cyclohexanol or especially water. As is done in dyeing, the substrate is left in the liquor for a certain time—generally, 10 minutes to 24 hours will suffice—at 10° to 120° C.; if desired, the liquor may be moved about during this period of time. The material is then rinsed, if desired washed and dried.

In many cases it is found advantageous to use the above-mentioned light filters in combination with sterically hindered phenols, esters of thiodipropionic acid or organic phosphorus compounds.

Unless otherwise indicated, all parts in the following examples are by weight.

MANUFACTURING INSTRUCTIONS

A. A mixture of 54 parts of 1,4-phenylenediamine, 292 parts of oxalic acid diethyl ester and 2 parts of boric acid is heated to 120° C. Within 6 to 8 hours 35 to 40 parts of ethanol pass over. The reaction mixture is subjected to steam distillation. Yield:(pure): 95 to 100 parts of the compound

(12)
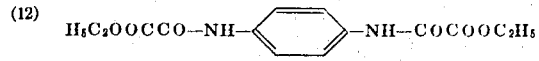

melting at 220° to 221° C. (from dioxane+cyclohexane).

Analysis:
| | | | |
|---|---|---|---|
| calculated: | C 54.56 | H 5.01 | N 9.06 |
| found: | C 54.54 | H 5.23 | N 9.09 |

B. 28 Parts of oxalyl monochloride monoethyl ester in 250 parts of toluene are stirred dropwise within 30 minutes at 60° C. into a solution of 36.8 parts of 4,4'-diaminodiphenyl in 500 parts of toluene, and the whole is then heated for another 2 hours at 85° to 90° C. After steam distillation there are obtained 65 to 70 parts of the product of the formula

(13)
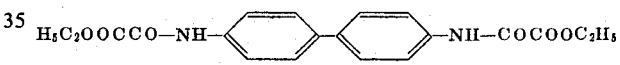

in substantially pure form. A specimen recrystallized from dichlorobenzene melts sharply at 225° to 227° C. and reveals the following analytical data:

| | | | |
|---|---|---|---|
| calculated: | C 62.49 | H 5.24 | N 7.29 |
| found: | C 62.67 | H 5.25 | N 7.32 |

C. A mixture of 24.4 parts of 3,3'-dimethoxy-4,4'-diaminodiphenyl, 122 parts of oxalic acid dibutyl ester and 0.5 part of boric acid is rapidly heated to 120° C. The temperature is then gradually raised to 160° C. within 7 hours and the batch is stirred on for 16 hours at this temperature, during which 5 parts of n-butanol pass over. After cooling with ice and stirring the precipitate is suctioned off and washed with alcohol. The dried crude product is extracted with nonane in a Soxhlet extractor. From the extract 32 parts of the product of the formula

(14)
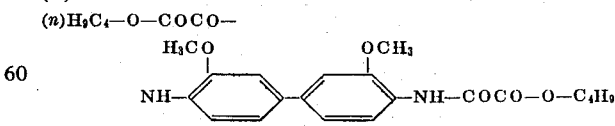

settle out; it is chromatographically pure and melts at 155° to 156° C. after strong sintering at 145° to 147° C.

Analysis:
| | | | |
|---|---|---|---|
| calculated: | C 62.39 | H 6.44 | N 5.60% |
| found: | C 62.18 | H 6.20 | N 5.72% |

The products listed in the following table were manufactured in a manner similar to that described under A and B above. The melting point in °C. is shown in volume IV and the analytical values for C, H and N in volume V (upper line: calculated, lower line: found).

TABLE

(15) $V_1OOC-CO-NH-W_t-NH-CO-COOV_1$

| I | II ($V_1=$) | III ($W_t=$) | IV | V | | |
|---|---|---|---|---|---|---|
| 16 | —$C_2H_5$ | 3,3'-dimethoxybiphenyl-4,4'-diyl | 228–229 | 59.45 / 59.71 | 5.44 / 5.27 | 6.30 / 6.36 |
| 17 | —$C_2H_5$ | 4,4'-methylenediphenyl | 150–151 | 63.31 / 63.53 | 5.57 / 5.67 | 7.03 / 7.22 |
| 18 | —$C_2H_5$ | 2-iodo-1,4-phenylene | 155–156 | 54.54 / 54.60 | 5.23 / 5.15 | 9.09 / 9.13 |
| 19 | —$C_2H_5$ | 4,4'-isopropylidenediphenyl | 205–206 | 64.77 / 64.89 | 6.15 / 6.28 | 6.57 / 6.56 |
| 20 | —$C_2H_5$ | 2-methyl-1,4-phenylene | 151–152 | 55.89 / 55.60 | 5.63 / 5.49 | 8.69 / 8.82 |
| 21 | —$C_2H_5$ | 4,4'-sulfonyldiphenyl | 267–268 | 53.57 / 53.52 | 4.49 / 4.45 | 6.25 / 6.35 |
| 22 | —$C_2H_5$ | 1,5-naphthylene | 215–216 | 60.33 / 60.18 | 5.06 / 5.17 | 7.87 / 7.78 |
| 23 | —$C_2H_5$ | 3,3'-dimethylbiphenyl-4,4'-diyl | 182–184 | 64.06 / 63.93 | 5.87 / 5.67 | 6.79 / 6.88 |
| 24 | —$C_2H_5$ | 2,5-dichloro-1,4-phenylene | 173.5–175 | 44.58 / 44.74 | 3.74 / 3.88 | 7.43 / 7.40 |
| 25 | —$C_2H_5$ | 2-chloro-5-methyl-1,4-phenylene | 173–174 | 50.50 / 50.46 | 4.80 / 4.91 | 7.85 / 7.80 |
| 26 | —$C_2H_5$ | 3,3'-dimethyl-4,4'-methylenediphenyl | 123–125 | 64.77 / 64.85 | 6.15 / 6.14 | 6.57 / 6.64 |
| 27 | —$C_2H_5$ | 2,5-dimethyl-1,4-phenylene | 165–167 | 57.13 / 57.39 | 5.99 / 5.90 | 8.33 / 8.58 |
| 28 | —$C_2H_5$ | 3,3'-dichlorobiphenyl-4,4'-diyl | 202–203 | 53.00 / 52.73 | 4.00 / 4.26 | 6.18 / 6.16 |
| 29 | —$C_2H_5$ | 2-methoxy-1,4-phenylene | 146–147 | 53.25 / 53.49 | 5.36 / 5.40 | 8.28 / 8.31 |
| 30 | —$C_2H_5$ | 4,4'-thiodiphenyl | 191–192 | 57.68 / 57.61 | 4.84 / 5.03 | 6.73 / 6.92 |
| 31 | —$C_2H_5$ | 4,4'-oxydiphenyl | 162–163 | 59.99 / 59.97 | 5.04 / 4.93 | 7.00 / 7.11 |
| 32 | —$C_2H_5$ | 4-methyl-4'-sulfonyldiphenyl | 106–108 | 54.54 / 54.74 | 4.92 / 4.92 | 6.06 / 6.06 |
| 33 | —$C_2H_5$ | 4,4'-iminodiphenyl | 204–206 | 60.14 / 59.97 | 5.30 / 5.25 | 10.52 / 10.74 |

EXAMPLE I

A solution of 0.1 part of sodium metal in 60 parts of n-octanol is heated to 125° to 130° C., 13.4 parts of the compound of the formula (16) are added and the whole is stirred for 2 hours at this temperature in an open vessel, then cooled to room temperature; 50 parts of ethanol are added, the whole is cooled for 1 hour in ice, suctioned and the residue is rinsed with 50 parts of alcohol. Recrystallization from benzine furnishes 12 parts of the compound of the formula

(34) 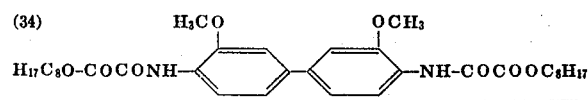

melting at 128°–129° C.

Analysis:
calculated:   C 66.64   H 7.90   N 4.57
found:        C 66.45   H 7.57   N 4.74.

EXAMPLE II

A mixture of 13.4 parts of the compound (16), 19 parts of stearyl alcohol, 0.25 part of sodium methylate and 175 parts of toluene is reacted with stirring for 9 hours at 100° to 105° C. in an open vessel, and then for another 2 days under reflux. The hot reaction solution is filtered clear, mixed at 80° C. with 80 parts of alcohol, cooled and suctioned. Yield: 18.5 parts (from benzine) of the compound of the formula

(35) 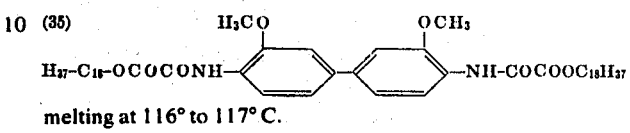

melting at 116° to 117° C.

Analysis:
calculated:   C 72.61   H 9.93    N 3.14
found:        C 72.79   H 10.06   N 3.29.

The compounds listed in the following table were prepared in a manner similar to that described in examples I and II; the melting point in °C. is shown in column IV and the analytical data for C, H and N in column V (upper line: calculated, lower line: found).

TABLE

(36) $V_2OOCCONH-W_5-NH-COCOOV_2$

| I | II ($V_2=$) | III ($W_5=$) | IV | V | | |
|---|---|---|---|---|---|---|
| 37 | —⌬—CH₂— | H₃CO—⌬—⌬—OCH₃ | 185–187 | 67.60 / 67.23 | 4.96 / 4.79 | 4.93 / 4.86 |
| 38 | H₃C—O—CH₂CH₂— | —⌬— | 164–165 | 52.17 / 52.60 | 4.57 / 5.36 | 7.61 / 7.67 |
| 39 | H₂C—CH—CH₂— | H₃CO—⌬—⌬—OCH₃ | 227–228 | 61.53 / 61.38 | 5.16 / 5.23 | 5.98 / 6.13 |
| 40 | ⌬H | H₃CO—⌬—⌬—OCH₃ | 190–191 | 65.44 / 65.09 | 6.22 / 6.46 | 5.09 / 5.12 |
| 41 | CH₃(CH₂)₃—CH(C₂H₅)—CH₂— | —⌬— | 122–123 | 65.52 / 65.36 | 8.46 / 8.35 | 5.88 / 5.92 |
| 42 | CH₃(CH₂)₃—CH(C₂H₅)—CH₂ | —⌬—⌬— | 171–172 | 69.54 / 69.66 | 8.02 / 7.80 | 5.07 / 5.14 |
| 43 | CH₃(CH₂)₃—CH(C₂H₅)—CH₂— | H₃CO—⌬—⌬—OCH₃ | 136–137 | 66.64 / 66.74 | 7.90 / 7.66 | 4.57 / 4.67 |
| 44 | —C₄H₉(n) | —⌬— | 181–183 | 59.33 / 59.44 | 6.64 / 6.54 | 7.69 / 7.73 |
| 45 | —CH₂CH₂CH₂—⌬ | —⌬— | 232–234 | 68.84 / 68.89 | 5.78 / 5.76 | 5.73 / 5.75 |
| 46 | —CH₂CH(C₂H₅)—CH₂—CH₃ | —⌬— | 195–196 | 62.84 / 62.57 | 7.67 / 7.44 | 6.66 / 6.61 |
| 47 | —CH(CH₃)—CH₂CH₂CH₃ | —⌬—⌬— | 136–138 | 66.65 / 66.88 | 6.88 / 7.09 | 5.98 / 7.04 |
| 48 | —C₄H₉(n) | —⌬—⌬— | 184–185 | 65.47 / 65.49 | 6.41 / 6.41 | 6.37 / 6.46 |
| 49 | —C₈H₁₇(n) | —⌬—⌬— | 171–172 | 69.54 / 69.50 | 8.02 / 8.15 | 5.07 / 4.87 |
| 50 | —CH₂—CH(C₂H₅)—CH₂—CH₃ | Cl—⌬—⌬—Cl | 116–118 | 59.60 / 59.63 | 6.06 / 6.13 | 4.95 / 4.84 |
| 51 | —C₁₀H₂₁(n) | Cl—⌬—⌬—Cl | 96–98 | 63.80 / 63.51 | 7.44 / 7.33 | 4.13 / 4.22 |

TABLE

(36) V₂OOCCONH—W₅—NH—COCOOV₂

| I | II (V₂=) | III (W₅=) | IV | V | | |
|---|---|---|---|---|---|---|
| 52 | —CH(CH₃)CH₃ (isopropyl: CH with CH₂, CH₃) | H₃CO—C₆H₃—C₆H₃—OCH₃ | 201–202 | 61.01 / 61.26 | 5.97 / 5.87 | 5.93 / 6.17 |
| 53 | —CH₂CH₂OCH₂CH₂OCH₂CH₃ | H₃CO—C₆H₃—C₆H₃—OCH₃ | 117–119 | 58.05 / 58.21 | 6.50 / 6.49 | 4.51 / 4.62 |
| 54 | —C₄H₉(n) | —C₆H₄—CH₂—C₆H₄— | 135–137 | 66.06 / 66.13 | 6.65 / 6.70 | 6.16 / 6.33 |
| 55 | —CH₂CH(C₂H₅)CH₂—CH₃ | —C₆H₄—CH₂—C₆H₄— | 91–94 | 68.21 / 68.30 | 7.50 / 7.32 | 5.49 / 5.52 |
| 56 | —CH(CH₃)CH₂CH(CH₃)(CH₃) | —C₆H₄—CH₂—C₆H₄— | 109–111 | 68.21 / 68.46 | 7.50 / 7.49 | 5.49 / 5.69 |
| 57 | —CH(CH₃)CH₂CH(CH₃)(CH₃) | —C₆H₄— | 185–187 | 62.84 / 62.67 | 7.67 / 7.60 | 6.66 / 6.84 |
| 58 | —C₈H₁₇(n) | —C₆H₄— | 109–111 | 65.52 / 65.58 | 8.46 / 8.42 | 5.88 / 5.97 |
| 59 | —C₈H₁₇(n) | —C₆H₃Cl₂— (2,5-dichloro) | 72–74 | 57.25 / 57.16 | 7.02 / 6.97 | 5.14 / 5.19 |
| 60 | —CH₂CH(C₂H₅)(CH₂)₃—CH₃ | Cl—C₆H₃—C₆H₃—Cl | 60–66 | 61.83 / 61.95 | 6.81 / 6.83 | 4.51 / 4.52 |
| 61 | —C₁₂H₂₅(n) | Cl—C₆H₃—C₆H₃—Cl | 93–95 | 65.47 / 65.35 | 7.97 / 7.99 | 3.82 / 3.95 |
| 62 | —C₁₈H₃₇(n) | Cl—C₆H₃—C₆H₃—Cl | 93–96 | 69.23 / 68.73 | 9.16 / 8.95 | 3.11 / 3.20 |
| 63 | —CH₂CH(C₂H₅)(CH₂)₃—CH₃ | —C₆H₄—CH₂—C₆H₄— | 67–72 | 69.94 / 70.19 | 8.18 / 8.04 | 4.94 / 4.94 |
| 64 | —C₁₂H₂₅(n) | —C₆H₄—CH₂—C₆H₄— | 119–121 | 72.53 / 72.81 | 9.21 / 9.21 | 4.13 / 4.21 |
| 65 | —C₁₈H₃₇(n) | —C₆H₄—CH₂—C₆H₄— | 124–125 | 75.13 / 75.41 | 10.23 / 10.39 | 3.31 / 3.27 |
| 66 | —CH₂CH(C₂H₅)(CH₂)₃—CH₃ | —C₆H₄—SO₂—C₆H₄— | 147–149 | 62.32 / 62.38 | 7.20 / 7.29 | 4.55 / 4.70 |
| 67 | —CH₂—C(CH₃)₂—CH₂—CH(CH₃)(CH₃) | H₃C—C₆H₃—C₆H₃—CH₃ | 109–110 | 70.31 / 70.41 | 8.33 / 8.37 | 4.82 / 4.89 |
| 68 | —CH₂CH(C₂H₅)(CH₂)₃—CH₃ | naphthalene-2,6-diyl | 83–86 | 68.41 / 68.66 | 8.04 / 8.09 | 5.32 / 5.34 |
| 69 | —C₁₂H₂₅(n) | naphthalene-2,6-diyl | 172–173 | 71.44 / 71.37 | 9.15 / 9.18 | 4.39 / 4.43 |
| 70 | —C₈H₁₇(n) | —C₆H₄—C(CH₃)₂—C₆H₄— | 78–81 | 70.67 / 70.50 | 8.47 / 8.45 | 4.71 / 4.80 |

TABLE

(36) $V_2OOCCONH-W_5-NH-COCOOV_2$

| I | II ($V_2$) | III ($W_5$) | IV | V | | |
|---|---|---|---|---|---|---|
| 71 | $-C_8H_{17}(n)$ | —⟨phenyl⟩—O—⟨phenyl⟩— | 118–119 | 67.58<br>67.44 | 7.80<br>7.92 | 4.93<br>4.81 |
| 72 | $(CH_2CH_2O)_3-CH_2CH_3$ | H₃CO / OCH₃ substituted biphenyl-methylene | 108–110 | 57.62<br>57.71 | 6.83<br>6.96 | 3.95<br>4.14 |
| 73 | $-C_8H_{17}(n)$ | $H_3C$—⟨phenyl⟩—$CH_2$—⟨phenyl⟩—$CH_3$ | 58–60 | 70.67<br>70.70 | 8.47<br>8.75 | 4.71<br>4.80 |
| 74 | $-CH_2-\overset{C_2H_5}{\underset{|}{CH}}-(CH_2)_3-CH_3$ | —⟨phenyl⟩—NH—⟨phenyl⟩— | 113–114 | 67.70<br>67.70 | 7.99<br>7.94 | 7.4₂⁰<br>7.4₂ |
| 75 | $-C_8H_{17}(n)$ | 2,5-dimethylphenyl ($H_3C$, $CH_3$) | 83–84 | 66.64<br>66.17 | 8.79<br>8.69 | 5.55<br>5.60 |
| 76 | $-C_8H_{17}(n)$ | 2-methyl-5-chlorophenyl ($H_3C$, $Cl$) | 82–83 | 61.75<br>61.82 | 7.80<br>7.82 | 5.34<br>5.38 |
| 77 | $-C_{12}H_{25}(n)$ | methylphenyl ($CH_3$) | 78–79 | 69.73<br>69.90 | 9.70<br>9.65 | 4.65<br>4.85 |

PAT. No. 3639249—F. 298

EXAMPLES OF APPLICATIONS

In each of the following examples of application a typical representative of the respective subgroup of compounds of this invention was used. In principle, all compounds mentioned in the preceding description and their equivalents are equally suitable, except that the solubility of the compound chosen in the substrate to be used must be taken into consideration or first determined by a small-scale test. Moreover, it should be mentioned in this context that compounds, in which in the central member the two aryl nuclei are connected by an intermediate member X, absorb by about 30 mµ less towards the visible light, and this must likewise be taken into consideration to suit the individual application.

EXAMPLE 1

An acetylcellulose film about 50µ thick is produced by casting a 10 percent acetonic acetylcellulose solution containing 1 percent (calculated from the acetylcellulose) of the compound of formula (12). After drying, the following percentage light transmission values are obtained:

| Wavelength in mµ | Light transmission in %  | |
|---|---|---|
| | unexposed | exposed (for 100 hours in a fadeometer |
| 280 to 320 | 2 | 2 |
| 330 | 5 | 5 |
| 340 | 14 | 14 |
| 350 | 34 | 34 |
| 360 | 60 | 60 |
| 370 | 79 | 78 |

The compounds of the formulas 13, 16, 19, 20, 21, 34 or 42, for example, display a similar behavior.

EXAMPLE 2

A paste prepared from 100 parts of polyvinylchloride, 59 parts by volume of dioctylphthalate and 0.2 part of the compound of the formula (13) is calendered at 145° to 150° C. to form a foil about 0.5 mm. thick. The polyvinylchloride foil obtained in this manner absorbs completely within the ultraviolet region from 280 to 360 mµ.

Instead of the compound of the formula (13) there may be used, for example, a compound of one of the following formulas: 12, 19, 23, 24 to 28, 34, 39, 42 to 50, 52, 55, 56, 57 or 63 to 73.

EXAMPLE 3

A mixture of 100 parts of polyethylene and 0.2 part of the compound of the formula (34) is calendered at 130° to 140° C. to form a foil which is then pressed at 150° C.

The polyethylene foil obtained in this manner is substantially impermeable to ultraviolet light within the region from 280 to 360 mµ.

Instead of the compound of the formula 34 there may be used, for example, a compound of one of the following formulas: 12, 19, 22, 35, 39, 52, 60, 66 or 67.

EXAMPLE 4

A mixture of 100 parts of polypropylene and 0.2 part of one of the compounds of the formulas 24, 26, 27, 34, 35, 41, 50, 57, 59, 68 or 69 is calendered at 170° C. to form a sheet which is then pressed at 230° to 240° C. under a maximum pressure of 40 kg./cm.² to form a panel 1 mm. thick.

The resulting panels are impermeable to ultraviolet light within the region from 280 to 360 m$\mu$. Other compounds listed in the table display a similar behavior.

EXAMPLE 5

A solution of 0.2 part of the compound of the formula (34) in 1.8 parts of monostyrene is mixed with 0.5 part of a solution of cobalt naphthenate in monostyrene (containing 1 percent of cobalt). Then 40 parts of an unsaturated polyester resin based on phthalic acid+maleic acid+ethyleneglycol in monostyrene are added and the whole is stirred for 10 minutes. 1.7 Parts of a catalyst solution (methylethyl ketone peroxide in dimethyl-phthalate) are dropped in and the well stirred, air-free mass is poured in between two plates of glass. After 20 minutes the polyester panel of 1 mm. thickness has solidified sufficiently to enable it to be taken out of the mould. It is impermeable to ultraviolet light within the region from 280 to 370 m$\mu$.

The compound of the formula 34 may be replaced, for example, by one of the compounds of the formulas 26, 28, 31, 43, 50, 51, 59, 60, 61, 68 or 70.

EXAMPLE 6

25 Grams of distilled monostyrene are prepolymerized in a stoppered bottle for 2 days at 90° C. in a heating cabinet, and then 0.25 g. of one of the compounds of the formulas 26, 28, 34, 42, 43, 50, 51, 68 or 69 and 0.025 g. of benzoyl peroxide are slowly stirred into the viscous mass. The mixture is then poured into a cube-shaped mould of aluminum foil and heated for 1 day at 70° C. After the mass has completely solidified and cooled off, the mould is broken up. The block is then pressed in a hydraulic press at a temperature of 138° C. under a pressure of 150 kg./cm.$^2$ to form a panel 1 mm. thick.

The polystyrene panels manufactured in this manner are impermeable to ultraviolet light within the region from 280 to 370 m$\mu$. They are completely colorless.

EXAMPLE 7

10,000 parts of a polyamide, manufactured in known manner from caprolactam, in chip form are mixed for 12 hours in a tumbler with 30 parts of one of the compounds of the formulas 21, 35, 38, 43, 60, 67 or 70. The chips treated in this manner are melted in a boiler, from which the atmospheric oxygen has been displaced with superheated steam and which is heated at 300° C., and the melt is stirred for one-half hour. The melt is then expressed under a nitrogen pressure of 5 atmospheres (gauge) through a spinneret and the spun and cooled filament is wound up on a spinning bobbin, whereby it is at the same time stretched.

The degradation of the macromolecules caused by the exposure in the fadeometer and measured by the relative viscosity in concentrated sulphuric acid is substantially reduced by the addition of the above compounds.

Other compounds listed in the table display a similar behavior.

EXAMPLE 8

0.2 Gram of the compound of the formula (18) is dissolved in 10 g. of pure olive oil. A 50 $\mu$ thick layer of this solution absorbs ultraviolet light up to 330 m$\mu$ completely.

In identical manner other fatty oils and creams or emulsions used for cosmetic purposes may be used for dissolving the compounds referred to above.

Instead of the compound of the formula (18) there may be used, for example, the compound of the formula 21, 34, 43, 50, 57 or 58.

EXAMPLE 9

12 Grams of polyacrylonitrile are strewn with stirring into 88 g. of dimethylformamide until all has dissolved. They 0.1 g. of a compound, for example of formula 35, which dissolves immediately, is added. The viscous mixture is then applied to a cleaned plate of glass and spread out with a film drawing rod. The treated plate of glass is then dried for 20 minutes at 120° C. in a vacuum drying cabinet under a pressure of 150 mm. Hg. A foil is obtained which has a thickness of about 0.05 mm. which is easy to pull off the glass plate; it is completely colorless and absorbs ultraviolet light up to a wavelength of 350 m$\mu$ substantially completely, whereas a foil that does not contain the above compound of the formula 35 passes at least 80 percent of the ultraviolet light. Incidentally, the compounds mentioned in connection with polystyrene may likewise be incorporated with polyacrylonitrile.

We claim:

1. A process for protecting organic materials selected from the group consisting of organic polymeric materials from the action of ultraviolet rays, which comprises applying to said materials from 0.01 to 10 percent by weight of a bis-oxalic acid amide ester corresponding to the formula $$A_2-O-CO-CO-NH-W_1-NH-CO-CO-O-A_2$$

in which $A_2$ represents an alkyl, alkenyl, cycloalkyl or aralkyl radical containing up to 20 carbon atoms, which does not displace the absorption maximum of these compounds to values above 370 m$\mu$ and which may also contain further substituents; $W_1$ represents a phenylene, diphenylene, naphthylene residue or a residue

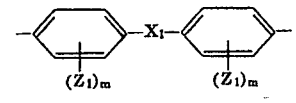

and the phenylene groups of these residues may contain one or two substituents $Z_1$, $Z_1$ being an alkyl or alkoxy group containing one to four carbon atoms, or a halogen atom or an $SO_3H$ group; $m=0$, or 2, and $X_1$ represents an alkylene group containing one to four carbon atoms or a bridge member $-O-$, $-S-$, $-NH-$ or $-SO_2-$.

2. A process according to claim 1, wherein a symmetric bis-oxalic acid amide ester of the formula $$A_3-O-CO-CO-NH-W_2-NH-CO-CO-O-A_3$$

is used in which $A_3$ represents an alkyl group containing one to 18 carbon atoms, a phenylakyl group whose alkyl residue contains one to four carbon atoms, an alkoxyalkyl group with one to 12 carbon atoms and preferably one to three $-O-$ bridges, an alkenyl group containing one to four carbon atoms or a cyclohexyl group, and $W_2$ represents a 1,3- or 1,4-phenylene, a 4,4'-diphenylene or a 1,4- or 1,5-naphthylene group or a group

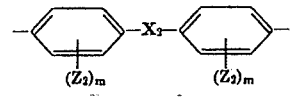

in which $X_2$ represents a bridge member $-SO_2-$ or a linear or branched alkylene group containing one to four carbon atoms and phenylene nuclei of the aforesaid groupings may contain one or two substituents $Z_2$, $Z_2$ being halogen or an alkyl or alkoxy group containing one to four carbon atoms, and $m=0$, 1 or 2.

3. A process according to claim 1, wherein a symmetric bis-oxalic acid amide ester of the formula $$A_3-O-CO-CO-NH-W_3-NH-CO-CO-O-A_3$$

is used, in which $A_3$ represents an alkyl group containing one to 18 carbon atoms, a phenylalkyl group whose alkyl residue contains one to four carbon atoms, an alkoxyalkyl group containing one to 12 carbon atoms and preferably one to three $-O-$ bridges, an alkenyl group containing one to four carbon atoms or a cyclohexyl group, and $W_3$ represents a 1,3- or 1,4-phenylene, a 4,4'-di-phenylene or 1,4- or 1,5-naphthalene group, and phenylene nuclei in the aforesaid groupings may contain one or two substituents $Z_2$, $Z_2$ being a halogen atom or an alkyl or alkoxy group containing one to four carbon atoms.

4. A process according to claim 1, wherein a symmetric bis-oxalic acid amide ester is used which corresponds to the formula $$A_4-O-CO-CO-NH-W_2-NH-CO-CO-O-A_4$$

in which $A_4$ represents an alkyl group containing one to six carbon atoms and $W_2$ a 1,3- or 1,4-phenylene, a 4,4'-diphenylene or 1,4- or 1,5-naphthylene group or a group

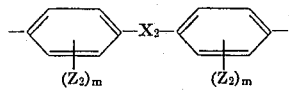

in which $X_2$ represents a bridge member $-SO_2-$ or a linear or branched alkylene group containing one to four carbon atoms and phenylene nuclei of the aforesaid groupings may contain one or two substituents $Z_2$, $Z_2$ being halogen or an alkyl or alkoxy group containing one to four carbon atoms, and $m=0$, 1 or 2.

5. A process according to claim 1, wherein a symmetric bis-oxalic acid amide ester of the formula $$A_5-O-CO-CO-NH-W_2-NH-CO-CO-O-A_5$$

is used in which $A_5$ represents an alkyl group containing seven to 18 carbon atoms, a phenylalkyl group whose alkyl residue contains one to four carbon atoms, an alkoxyalkyl group containing one to eight carbon atoms and one to three oxygen bridges, an allyl or cyclohexyl group, and $W_2$ represents a 1,3- or 1,4-phenylene group, a 4,4'-diphenylene group, a 1,4- or 1,5-naphthylene group or a group

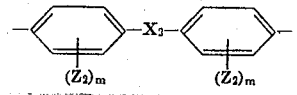

in which $X_2$ represents a bridge member $-SO_2-$ or a linear or branched alkylene group containing one to four carbon atoms and phenylene nuclei of the aforesaid groupings may contain one or two substituents $Z_2$, $Z_2$ being halogen or an alkyl or alkoxy group containing one to four carbon atoms, and $m=0$, 1 or 2.

6. Organic polymeric materials containing 0.01 to 10 percent, by weight, referred to the organic material of at least one bis-oxalic acid amide ester as defined in claim 1 as an ultraviolet absorber.

* * * * *